United States Patent [19]
Bastian

[11] Patent Number: 5,203,135
[45] Date of Patent: Apr. 20, 1993

[54] CONNECTION FOR HOLLOW STRUCTURAL MEMBERS

[75] Inventor: John M. Bastian, Manitowoc, Wis.

[73] Assignee: Hamilton Industries, Inc., Two Rivers, Wis.

[21] Appl. No.: 665,327

[22] Filed: Mar. 5, 1991

[51] Int. Cl.⁵ .............................................. E04C 3/32
[52] U.S. Cl. ................................... 52/726.1; 403/297; 403/292
[58] Field of Search ............... 403/297, 298, 292, 295; 52/282, 726

[56] References Cited

U.S. PATENT DOCUMENTS

| | | |
|---|---|---|
| 2,850,304 | 9/1958 | Wagner . |
| 3,000,656 | 9/1961 | Hollaender . |
| 3,338,602 | 8/1967 | Arnd . |
| 3,484,830 | 12/1969 | Wagner et al. . |
| 3,701,553 | 10/1972 | Vogt . |
| 3,822,101 | 7/1974 | Schneider . |
| 4,002,261 | 1/1977 | Litchfield ............................. 52/282 |
| 4,104,000 | 8/1978 | Fleischmann . |
| 4,159,758 | 7/1979 | Courson ............................. 403/297 |
| 4,485,597 | 12/1984 | Warrallo . |
| 4,570,408 | 2/1986 | Frascaroli et al. ................. 403/297 |
| 4,662,138 | 5/1987 | Bryant ............................... 52/282 |
| 4,691,818 | 9/1987 | Weber ................................. 403/292 |
| 4,859,109 | 8/1989 | Targetti . |
| 5,078,534 | 1/1992 | White ................................. 403/292 |

FOREIGN PATENT DOCUMENTS

| | | | |
|---|---|---|---|
| 409764 | of 1967 | Australia ............................ 403/297 |
| 2403832 | 8/1975 | Fed. Rep. of Germany ...... 403/297 |
| 1496182 | of 1967 | France ............................... 403/298 |
| 1562522 | of 1969 | France ............................... 403/292 |
| 449334 | 4/1968 | Switzerland ....................... 403/297 |
| 666729 | 8/1988 | Switzerland ....................... 403/292 |

*Primary Examiner*—David A. Scherbel
*Assistant Examiner*—Joanne C. Downs
*Attorney, Agent, or Firm*—Tilton, Fallon, Lungmus & Chestnut

[57] ABSTRACT

An assembly for connecting together a pair of structural members disposed in end-to-end relation includes a bridging member having an irregular surface and securing devices for securing the bridging member to the structural members. Each structural member includes a bore with a complementary surface which mates with the irregular surface of the bridging member. The securing devices place the irregular surface of the bridging member in abutting relation with the complementary surfaces of the structural members.

10 Claims, 1 Drawing Sheet

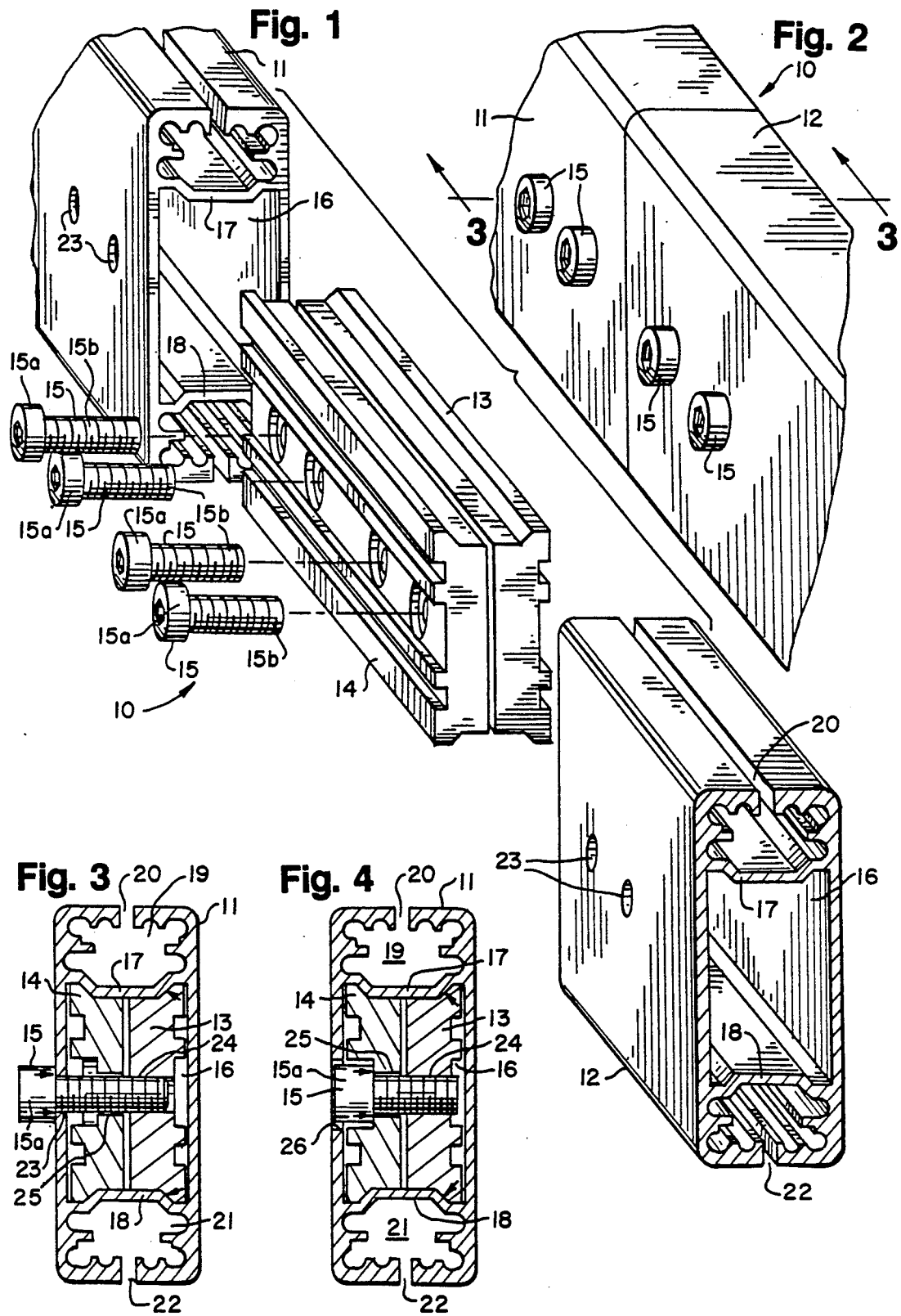

CONNECTION FOR HOLLOW STRUCTURAL MEMBERS

BACKGROUND OF THE INVENTION

1. Field Of The Invention

The present invention relates to a connection for hollow structural members disposed in end-to-end relation and more particularly to a connection including a bridging member which wedges against the inner walls of the structural members and secures them together.

2. Description Of The Prior Art

The prior art includes a wide variety of connectors for hollow members, typically pipes, disposed in end-to-end relation. Many of these devices operate within the hollow members and expand outwardly to engage the sides of the hollow members and secure the members together.

Many of the prior connectors are complex devices with a multiplicity of parts. They engage uniform inner surfaces of the hollow members and fail to provide secure connections for them. They do not provide sufficient clamping force to assure an effective connection.

The connection of the present invention avoids the disadvantages outlined above. It is a simple construction which effectively secures the ends of hollow members together. It provides a rigid, self-aligning connection; it allows quick and easy installation; and it minimizes the cost of manufacture and assembly.

SUMMARY OF THE INVENTION

In accordance with one embodiment of the present invention, a connection generally includes a pair of structural members disposed in end-to-end relation, a bridging member, and securing devices for securing the bridging member to the structural members. The structural members and bridging member are extruded, or otherwise formed, components made of metal or any other material of high strength and rigidity. Similarly, the securing devices are bolts made of metal or other high strength material; and they have threaded ends.

The bridging member has an irregular surface portion; and each structural member defines a bore with at least one complementary, irregular surface portion which mates with the irregular surface portion of the bridging member. A portion of the bridging member extends into the bore of one of the structural members while another portion extends into the bore of the other structural member.

At least one bolt secures each of the structural members to the bridging member. Each bolt extends through an opening defined by the structural member. The head of the bolt engages the outside surface of the structural member adjacent the opening and the opposite threaded end extends into a threaded opening defined by the bridging member. Moving the bolt into the threaded opening results in movement of the bridging member in the opposite direction, i.e., towards the side of the structural member which has the opening for the bolt. This movement brings the complementary, irregular surfaces of the structural member and the bridging member together in abutting relation.

The connection may also include a second bridging member disposed in side-by-side, co-extensive relation with the bridging member described above. This second bridging member also has at least one irregular surface portion which mates with the irregular surface portions of the structural members. It lies between the heads of the bolts and the other bridging member. Tightening of the bolts, in addition to the reaction described above, bows the structural members inward at the head of the bolts. Accordingly, the bowed portion engages the second bridging member and moves it in a direction opposite the direction of movement of the other bridging member. This movement brings the irregular surface of the second bridging member against the irregular surface of the structural members.

In the alternative employing a second bridging member, the structural members may define an enlarged bolt opening to allow the head of the bolt to engage the second bridging member rather than the structural member. The head engages the area around an opening through which the bolt extends in sliding relation with the walls of the opening.

BRIEF DESCRIPTION OF THE DRAWINGS

For a more complete understanding of this invention one should now refer to the embodiment illustrated in greater detail in the accompanying drawings and described below by way of an example of the invention. In the drawings:

FIG. 1 is an exploded perspective view of the connection of the present invention;

FIG. 2 is a perspective view of the connection in assembled configuration;

FIG. 3 is a sectional view taken along line 3—3 in FIG. 2;

FIG. 4 is a sectional view showing an alternative bolt hole construction.

While the following disclosure describes the invention in connection with one embodiment one should understand that the invention is not limited to this embodiment. Furthermore, one should understand that the drawings are not to scale and that graphic symbols, diagrammatic representations, and fragmentary views, in part, may illustrate the embodiment. In certain instances, the disclosure may not include details which are not necessary for an understanding of the present invention.

DETAILED DESCRIPTION OF THE DRAWINGS AND AN EMBODIMENT

Turning now to the drawings, FIGS. 1 and 2 show the connection according to one embodiment of the present invention at 10. This connection generally includes a first, hollow structural member 11 and a second hollow structural member 12 disposed in end-to-end relation; a first bridging member 13; a second bridging member 14; and securing bolts 15 for securing the bridging members to the structural members. The structural members 11 and 12 and the bridging members 13 and 14 are extruded, or otherwise formed, components made of metal or any other material of high strength and rigidity. Similarly, metal or any other high strength material form the bolts 15.

The structural members 11 and 12 have the same cross-sectional configuration (shown in FIG. 3), including: a central bore 16; an inner partition 17 at one end of the bore 16; another inner partition 18 at the other, opposite end of the bore 16; a first channel 19 disposed adjacent the partition 17 and open to the outside of the structural member through a slit 20; and a second channel 21 disposed adjacent the partition 18 and open to the outside of the structural member through a slit 22. The inner partitions 17 and 18 have a channel-like cross-sectional configuration with sloping sides and a flat middle portion. They provide an irregular surface at opposite sides of the bore 16.

The bridging members 13 and 14 lie side-by-side, in co-extensive relation and fill a substantial portion of the bores 16 in which they extend. They extend a predetermined distance into the bore 16 of the member 11 and the bore 16 of the member 12. The bridging member ends disposed adjacent the partition portions 17 and 18 of the structural members have a shape complementary to the shape of the partition portions. These mating, irregular surfaces allow the bridging members to engage the structural members and secure them together.

In the embodiment shown, two bolts 15 secure each of the structural members to the bridging member 13. Each bolt extends through an opening 23 defined by the structural member (See FIGS. 1 and 3). The head 15a of each bolt 15 engages the outside surface of the structural member adjacent the opening 23 and an opposite threaded end 15b extends into a threaded opening 24 defined by the bridging member 13. Moving the bolt 15 into the threaded opening 24 results in movement of the bridging member 13 in the opposite direction, i.e.. towards the head of the bolt 15a. This movement brings the complementary, irregular surfaces of the structural member and the bridging member 13 together in abutting relation.

As shown in FIG. 3, the second bridging member 14 lies between the heads 15a of the bolts 15 and the other bridging member 13. The bolts extend through openings 25 in sliding relation with the walls of the opening 25. (The opening 25 has a diameter slightly larger than the diameter of the bolt 15.) Tightening of the bolts 15, in addition to the reaction described above, bows the structural member portions proximate the heads of the bolts inward of the member. Accordingly, the bowed portion engages the second bridging member 14 and moves it in a direction opposite the direction of movement of the first bridging member 13. This movement brings the irregular surface of the second bridging member 14 against the irregular surface of the partition portions of the structural members.

As an alternative, the structural members 11 and 12 may define an enlarged bolt opening 26 (See FIG. 4) to allow the head 15a of the bolt 15 to engage the second bridging member 14 directly rather than the structural member. The head 15a engages the area around the opening 25 defined by the bridging member 14. The distal portion of the head 15a remains in the enlarged opening 26 to assure that the structural members 11 and 12 do not slide apart or relative to the bridging members. As stated above, the bolt 15 extends through the opening 25 in sliding relation with the walls of the opening 25; and it secures the members 13 and 14 as described above.

While the above description and the drawings disclose and illustrate one embodiment, one should understand, of course, that the invention is not limited to this embodiment. Those skilled in the art to which the invention pertains may make modifications and other embodiments employing the principles of this invention, particularly upon considering the foregoing teachings. Therefore, by the appended claims, the applicant intends to cover any such modifications and other embodiments as incorporate those features which constitute the essential features of this invention.

What is claimed is:

1. In combination with a pair of structural members disposed in end-to-end relation, a bridging member having an irregular surface portion, a second bridging member, said second bridging member combining with the bridging member to substantially fill the portions of the structural member bores over which they extend, and securing means for securing the bridging member to the two structural members, each structural member defining a bore with a complementary irregular surface portion which mates with the irregular surface of the bridging member, the securing means placing the irregular surface of the bridging member in abutting relation with the complementary surfaces of the structural members without deforming the bridging member, a portion of the bridging member and the second bridging member extending into the bore of one structural member, and the remaining portion of the bridging member and the second bridging member extending into the bore of the other structural member.

2. The combination of claim 1, wherein the securing means includes a plurality of bolts.

3. The combination of claim 2, wherein the bolts have threaded ends; the structural members and the second bridging member define openings through which the bolts extend; and the bridging member defines threaded openings for receiving the threaded ends of the bolts.

4. The combination of claim 3, wherein the bolts have enlarged head portions at the ends opposite the threaded portions, each head portion engaging the portions of the structural member around the opening of the structural member through which the bolt extends.

5. The combination of claim 3, wherein the bolts have enlarged head portions at the ends opposite the threaded portions, each head portion engaging the portions of the second bridging member around the opening of the second bridging member through which the bolt extends.

6. The combination of claim 1, wherein the structural members are extruded members having substantially the same cross-sectional configuration.

7. The combination of claim 1, wherein the securing means biases the entire bridging member towards one side of the bore.

8. In combination with a pair of structural members disposed in end-to-end, abutting relation, a bridging member having an irregular surface, and securing means for securing the bridging member to the two structural members, each structural member defining a bore with a complementary irregular surface portion which mates with the irregular surface of the bridging member, the bridging member being disposed on one side of each structural member bore, the securing means biasing the bridging member inwardly of the structural members and toward the opposite side of each structural member bore, the securing means placing the irregular surface of the bridging member in abutting relation with the complementary surfaces of the structural members without deforming the bridging member.

9. The combination of claim 8, wherein the cross-section of each bore of the structural members has a pair of opposite irregular sides, providing a varying height for the bore.

10. The combination of claim 9, wherein the bore of each structural member has a pair of straight sides and a generally rectangular peripheral configuration.

* * * * *

UNITED STATES PATENT AND TRADEMARK OFFICE
CERTIFICATE OF CORRECTION

PATENT NO. : 5,203,135

DATED : April 20, 1993

INVENTOR(S) : John M. Bastian

It is certified that error appears in the above-identified patent and that said Letters Patent is hereby corrected as shown below:

Column 4, lines 5-8

In Claim 1, lines 4-6, delete the phrase "said second bridging member combining with the bridging member to substantially fill the portions of the structural member bores over which they extend" and insert it in line 11, after "bridging member,".

Signed and Sealed this

Twenty-eighth Day of December, 1993

*Attest:*

BRUCE LEHMAN

*Attesting Officer*     Commissioner of Patents and Trademarks